United States Patent
Raghunathan et al.

(10) Patent No.: US 6,195,786 B1
(45) Date of Patent: Feb. 27, 2001

(54) CONSTRAINED REGISTER SHARING TECHNIQUE FOR LOW POWER VLSI DESIGN

(75) Inventors: Anand Raghunathan, Middlesex County, NJ (US); Sujit Dey, San Diego, CA (US); Ganesh Lakshminarayana; Niraj K. Jha, both of Princeton, NJ (US)

(73) Assignees: NEC USA, Inc.; Princeton University, both of Princeton, NJ (US)

( * ) Notice: Subject to any disclaimer, the term of this patent is extended or adjusted under 35 U.S.C. 154(b) by 0 days.

(21) Appl. No.: 09/089,388

(22) Filed: Jun. 3, 1998

Related U.S. Application Data

(60) Provisional application No. 60/068,566, filed on Dec. 23, 1997.

(51) Int. Cl.[7] .................................................... G06F 17/50
(52) U.S. Cl. ................................................ 716/2; 716/7
(58) Field of Search ........................................ 716/2

(56) References Cited

U.S. PATENT DOCUMENTS

| | | | |
|---|---|---|---|
| 5,649,166 | * 7/1997 | Saldanha et al. | 395/500 |
| 5,682,519 | * 10/1997 | Saldanha et al. | 395/500 |
| 5,696,692 | * 12/1997 | Saldanha et al. | 364/489 |
| 5,831,864 | * 11/1998 | Raghunathan et al. | 364/488 |
| 6,038,381 | * 3/2000 | Munch et al. | 395/500.2 |

OTHER PUBLICATIONS

Raghunathan et al., Power Management Technique for Control–Flow Intensive Designs, Proceedings 34th Design Automation Conference, pp. 429–434, Jun. 1997.*

Ahmad et al., Integrated Scheduling, Allocation and Module Selection for Design–Space Exploration in High–Level Synthesis, IEEE Proceedings Computers and Digital Techniques, pp. 65–71, Jan.1995.*

Ferguson et al. Power Management in High Level Design, 2nd International Conference on ASIC, pp. 357–363, Oct. 1996.*

Ku et al., Relative Scheduling Under Timing Constraints, 27th ACM/IEEE Design Automation Conference, pp.59–64, Jun. 1990.*

(List continued on next page.)

Primary Examiner—Matthew S. Smith
Assistant Examiner—A. M. Thompson
(74) Attorney, Agent, or Firm—Sughrue, Mion, Zinn, Macpeak & Seas, PLLC

(57) ABSTRACT

A power management method and system targeted toward high-level synthesis of data-dominated behavioral descriptions. The method of the present invention is founded on the observation that variable assignment can significantly affect power management opportunities in the synthesized architecture. Based on this observation, a procedure for constraining variable assignment is provided so that the functional units in the synthesized architecture do not execute any spurious operations.

7 Claims, 9 Drawing Sheets

OTHER PUBLICATIONS

Kruse et al., Lower and Upper Bounds on the Switching Activity in Scheduled Data Flow Graphs, Proceedings 1999 International Symposium on Low Power Electronics and Design, pp. 115–120, Aug. 1999.*

Lee et al., Behavioral Synthesis for Easy Testability in Data Path Scheduling, Proceedings 1992 IEEE/ACM International Conference on Computer–Aided Design, pp. 616–619, Nov. 1992.*

Quinghua et al., On Gauranteed Task Scheduling in Real Time Distributed Process Control Systems, IEEE Region 10 Conference on Computer, Communication, Control and Power Engineering, pp. 68–71, Oct. 1993.*

Huang et al., Data Path Allocation Based on Bipartite Weighted Matching, Proceeding on 27th ACM/IEEE Design Automation Conference, pp. 499–504, Jun. 1990.*

Correale, "Overview of power minimization technique employed in the IBM PowerPC 4xx embedded processors," in Proc. Int. Symp. Low Power Design, pp. 75–80, Apr. 1995.

G. Tellex, A. Farrahi, and M. Sarrafzadeh, "Activity drived clock design for low power circuits," in Proc. Int. Conf. Computer–Aided Design, pp. 62–65, Nov. 1995.

L. Benine, PJ. Siegel, and G. De Micheli, "Saving power by synthesizing gated clocks for sequentials circuits," IEEE Design & Test of Computers, pp. 32–41, Winter 1994.

E. Musoll and J. Cortadella, "High–level synthesis techniques for reducing the activity of functional units," In Proc. Int. Symp. Low Power Design, pp. 99–104, Apr. 1995.

J. Monteiro, S. Devadas, P., Asher, and Mauskar, "Scheduling techniques to enable power management," In Proc. Design Automation Conf., pp. 349–352, Jun. 1996.

A. Raghunathan, S. Dey, N.K. Jha, and Wakabayashi, "Power management techniques for control–flow intensive designs," in Proc. Design Automation Conf., pp. 429–434, Jun. 1997.

A. Farrahi, G. Tellez, and M. Sarrafzadeh, "Memory segmentation to exploit sleep mode operation," in Proc. Design Automation Conf., pp. 36–41, Jun. 1995.

V. Tiwari and S. Malik, "Guarded evaluation: Pushing power management of logic level synthesis/design," in Proc. Int. Symp. Low Power Design, pp. 22–226, Apr. 1995.

M. Aldina, J. Monteiro, S. Devadas, A. Ghosh, and M. Papaefthymiou, "Precomputation–based sequential logic optimization for low power," IEEE Trans. VLSI Systems, vol. 2, pp. 426–436, Dec. 1995.

A. Raghunathan and N.K. Jha, "Behavioral synthesis for low power," in Proc. Int. Conf. Computer Design, pp.255–270, Oct. 1994.

J. Chang and M. Pedram, "Register allocation and binding for low power," in Proc. Design Automation Conf., pp. 29–35, Jun. 1995.

C.H. Gebotys, "Low energy memory and register allocation using network flow," in Proc. Design Automation Conf., pp. 435–440, Jun. 1997.

A. Raghunathan and N.K. Jha, "An iterative improvement algorithm for low power datapath synthesis," in Proc. Int. Conf. Computer–Aided Design. pp. 597–602, Nov. 1995.

A.P. Chandrakasan, M. Potkonjak, J. Rabaiy, and W. Brodersen, "HYPER–LP: A system for power minimization using architectural transformations," in Proc. INt. Conf. Computer–Aided Design, pp. 300–303, Nov. 1992.

* cited by examiner

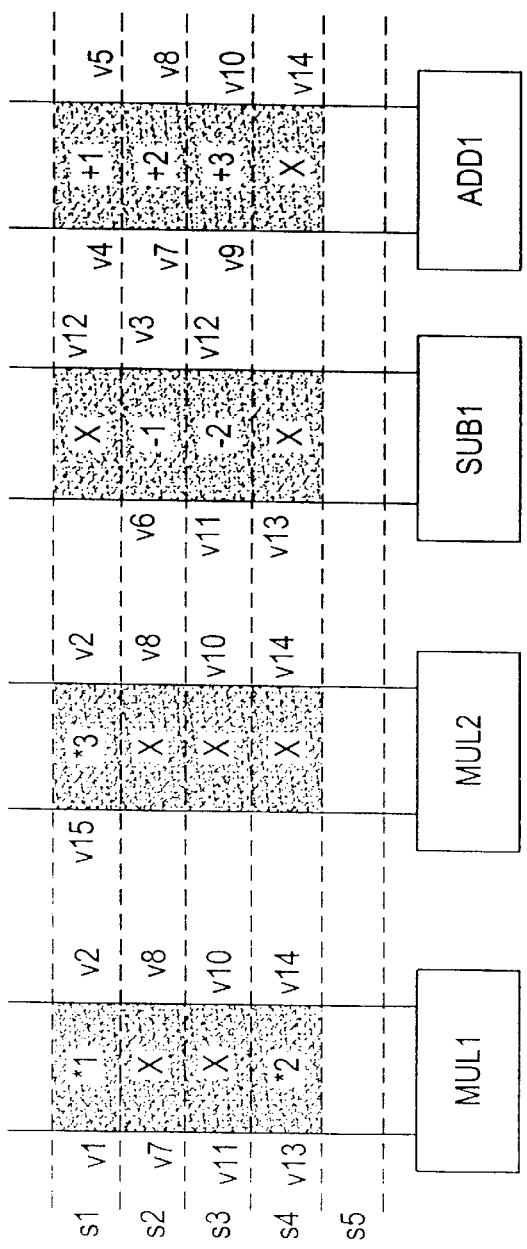
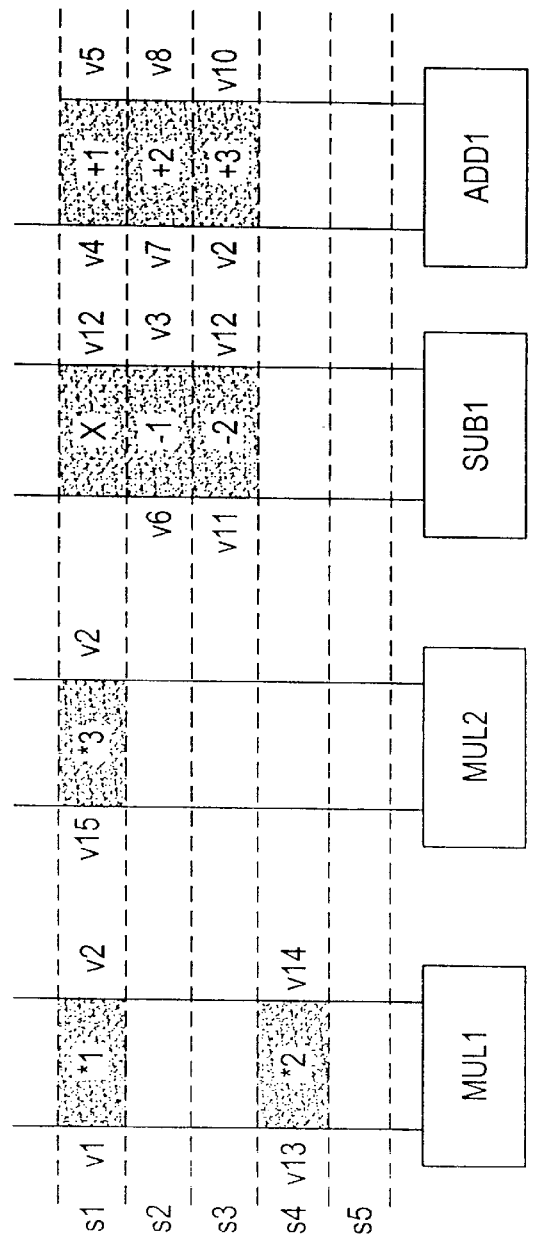
FIG. 2
FIG. 3

FIG. 9

```
PERFECT_POWER_MANAGEMENT(CDFG G, DATAPATH DP){
    foreach functional unit (fu) {
        foreach operation mapped to fu (op) {
            //List traversed in ascending order of birth
            if op is the last operation (in ascending order of birth) born in fu
                return true;
            //the previous statement ensures that we do not check
            //for inter-iteration dependencies at this stage
            foreach input variable vin_i of operation op {
                tbirthL_next  ← birth time of left input
                    of the operation succeeding op on fu;
                tbirthR_next  ← birth time of right input
                    of the operation succeeding op on fu;
                SET_DEATH_TIME(vin_i, max(tbirthL_next, tbirthR_next));
                if (LIFETIME(vin_i) conflicts with lifetime of
                    another variable mapped to the same register)
                    return false;
                    //this configuration cannot be perfectly power-managed
                set multiplexer at fu's input to select vin_i until
                    max(tbirthL_next, tbirthR_next);
            }
        }
    }
}
```

FIG. 10

```
FIX_INTER_ITERATION_DEPENDENCY_INDUCED_PROBLEMS(CDFG G,
                                    DATAPATH DP) {
   foreach functional unit (fu){
      op_j ← last operation (by ascending order of birth) mapped to fu;
      op_1 ← first operation (by ascending order of birth) mapped to fu;
      foreach input variable vin_i of operation op_j{
         tbirthL_1 ← birth time of left input of op_1;
         tbirthR_1 ← birth time of right input of op_1;
         if (max(tbirthL_1, tbirthR_1)>birth_time (vin_i)){
            if (there exists a variable assignment swap, with an interconnect
               overhead less than the threshold, which solves the problem)
               perform swap;
            else
               store successive iterations of vin_i in different registers;
         }
      }
   }
}
```

CONSTRAINED REGISTER SHARING TECHNIQUE FOR LOW POWER VLSI DESIGN

I. DESCRIPTION OF THE INVENTION

This application claims priority from U.S. Provisional Patent Application Ser. No. 60/068,566 filed on Dec. 23, 1997.

IA. FIELD OF THE INVENTION

This invention relates to reduction of power consumption for digital VLSI sequential circuits. Specifically, this invention relates to a system and method for reducing power consumption using constrained register sharing techniques. This invention is embodied in a constrained register sharing system and in methods for reducing power consumption in a sequential circuit using constrained register sharing.

IB. BACKGROUND

The dynamic component that is incurred, whenever signals in a circuit undergo logic transition, often dominates power dissipation in VLSI circuits. In practice, a large fraction of such transitions incurred during the operation of commonly used circuits are unnecessary. Such transitions have no bearing on the result computed by the circuit.

It can be reasonably concluded that not all parts of a circuit may need to function during each clock cycle. Some components may be idle in some clock cycles. Recognizing this fact, several low power design techniques have been proposed that are based on suppressing or eliminating unnecessary signal transitions. The term power management is used to refer to such techniques in general. Applying power management to a design typically involves two steps:

Identifying idle conditions for various parts of the circuit.

Redesigning the circuit to eliminate switching activity in idle components, therefore avoiding unnecessary power dissipation in those parts.

Power management is frequently deployed by designers of power-constrained systems and is arguably one of the most commonly used low power design techniques. See J. Rabaey and M. Pedram (Editors), Low Power Design Methodologies., Kluwer Academic Publishers, Norwell, Mass., (1996). It is desirable to have power management incorporated into automatic synthesis tools as well.

Many modern microprocessors have adopted the strategy of gating the clock input to registers and other circuit blocks to suppress unnecessary transitions in the clock signal as well as in the circuit block under consideration. See A. Correale, "Overview of power minimization techniques employed in the IBM PowerPC 4xx embedded processors, *Proc. Int. Symp. Low Power Design*, pp. 75–80 (April 1995). Automated synthesis techniques to apply clock gating and maximize its efficiency have been also been known. See G. Tellez A. Farrahi, and M. Sarrafzadeh, "Activity driven clock design for low power circuits.", *Proc. Int. Conf. Computer-Aided Design*, pp.62–65, (November 1995) and L. Benini, P. Siegel, and G. De Micheli, "Saving power by synthesizing gated clocks for sequential circuits", *IEEE Design & Test of Computers*, pp. 32–41, (Winter 1994).

Recently, high-level synthesis techniques for power management have been proposed. See E. Musoll and J. Cortadella, "High-level synthesis techniques for reducing the activity of functional units", *Proc. Int. Symp. Low Power Design*, pp. 99–104, (April 1995); J. Monteiro, S. Devadas, P. Ashar, and A. Mauskar, "Scheduling techniques to enable power management", *Proc. Design Automation Conf.*, pp. 349–352 (June 1996) and A. Raghunathan, S. Dey, N. K. Jha, and K. Wakabayashi, "Power management techniques for control-flow intensive designs", *Proc. Design Automation Conf.* pp. 429–434 (June 1997). A scheduling algorithm that aims to maximize the idle times for functional units was presented in J. Monteiro, S. Devadas, P. Ashar, and A. Mauskar, "Scheduling techniques to enable power management", *Proc. Design Automation Conf.*, pp. 349–352 (June 1996).

A controller respecification technique, based on redesigning the controller logic to reduce the activity in the components of the data path was presented in A. Raghunathan, S. Dey, N. K. Jha, and K. Wakabayashi, "Power management techniques for control-flow intensive designs, *Proc. Design Automation Conf.*, pp. 429–434 (June 1997). Techniques geared toward maximizing the "sleep times" of storage elements, such as registers and memories were presented in A. Farrahi, G. Tellez and M. Sarrafzadeh, "Memory segmentation to exploit sleep mode operation", *Proc. Design Automation Conf.*, pp.36–41 (June 1995). At the logic level, two successful power management techniques, based on guarded evaluation and pre-computation have been presented. See V. Tiwari and S. Malik, "Guarded evaluation: Pushing power management to logic level synthesis design, *Proc. Int. Symp. Low Power Design*, pp. 221–226 (April 1995) and M. Aldina, J. Monteiro, S. Devadas, A. Ghosh, and M. Papaefthymiou, "Precomputation based sequential logic optimization for low power", *IEEE Trans. VLSI Systems*, vol. 2, pp. 426–436.

Guarded evaluation identifies logic cones that can be shut down under certain input conditions. These logic cones are "guarded" by latches, which are disabled, thus preventing the logic cone from consuming power, when the output of the cone does not influence the circuit output. In precomputation a simple combinational circuit, called the precomputation circuit, is added to the original circuit. Under some input conditions, the precomputation logic shuts down the original circuit and itself computes the outputs.

Several conventional techniques have been used to reduce power consumption in a circuit by eliminating unnecessary logic transitions at various signals within the circuit. The term "power management" is collectively used to refer to these techniques.

High-level synthesis (also called behavioral synthesis) converts a behavioral description of a VLSI circuit into a structural, register-transfer level (RTL) implementation described as an interconnection of macro blocks (e.g., functional units, registers, multiplexers, buses, memory blocks, etc.), and random logic.

A behavioral description of a sequential circuit contains an algorithmic specification of its functionality. Such a description may contain almost no information about the cycle-by-cycle behavior of the circuit or its structural implementation. Behavioral synthesis tools typically compile a behavioral description into a suitable intermediate format, such as Control-Data Flow Graph (CDFG). Vertices in the CDFG represent various operations of the behavioral description. Data and control edges are used to represent data dependencies between operations and the flow of control.

High-level synthesis tools typically perform one or more of the following tasks: transformation, module selection, clock selection, scheduling, resource allocation and assignment (also called resource sharing or hardware sharing). Scheduling determines the cycle-by-cycle behavior of the design by assigning each operation to one or more clock cycles or control steps. Allocation decides the number of hardware resources of each type that will be used to implement the behavioral description. Assignment refers to the binding of each variable (and the corresponding operation) to one of the allocated registers (and the corresponding functional units).

Register sharing or assignment refers to a process of mapping each variable in the behavioral description of a sequential circuit to a register in its RTL implementation. A comprehensive survey on high-level synthesis techniques can be found in R. Camposano and W. Wolf, High-Level VLSI Synthesis. Kluwer Academic Publishers, Norwell, Mass., 1991 and D. D. Gajski, N. D. Dutt, A. C.-H. Wu, and S. Y.-L. Lin, *High-level Synthesis: Introduction to Chip and System Design.* Kluwer Academic Publishers, Norwell, Mass., 1992.

Automatic sequential circuit power management methodologies have been proposed that use the following techniques:

Clock Gating: Gating of clock signals to save power consumed in the clock network and registers L. Benini, P. Siegel, and G. DeMicheli, "Saving power by synthesizing gated clocks for sequential circuits," *IEEE Design & Test of Computers,* pp. 32–41 (Winter 1994) and L. Benini and G. DeMicheli, Automatic synthesis of gated-clock sequential circuits," *IEEE Trans. Computer-Aided Design,* vol. 15, pp. 630–643 (June 1996).

Pre-computation: Disabling registers from loading to save power consumption in the registers and the combinational logic fed by the registers M. Aldina, J. Monteiro, S. Devadas, A. Ghosh, and M. Papaefthymiou, "Precomputation-based sequential logic optimization for low power," *IEEE Trans. VLSI Systems,* vol. 2, pp. 426–436 (December 1994).

Operand Isolation: Inserting transparent latches at the inputs of an embedded combinational logic block, and additional control circuitry to detect idle conditions for the logic block 16, 7, 8]. The outputs of the control circuitry are used appropriately to disable the latches at the inputs of the logic block from changing values. Thus, the previous cycles input values are retained at the inputs of the logic block under consideration, eliminating unnecessary power dissipation.

Controller-based power management: Re-designing the control logic of a circuit such that the power consumption due to unnecessary switching activity in the data path is minimized A. Raghunathan, S. Dey, and N. K. Jha, "Power management techniques for control-flow, p intensive designs," *Proc. Design Automation Conf.,* pp. 429–434 (June 1997).

IC. Problems in Conventional Power Management Techniques

The first two techniques discussed above clock gating and pre-computation are applicable only to the clock network, and logic blocks that have registers at their inputs. Therefore, they cannot be used to save power in embedded logic blocks, i.e., logic blocks whose inputs are connected to the outputs of other combinational logic blocks.

The third and fourth techniques, operand isolation and controller-based power management can be applied to arbitrary embedded logic blocks. However, several disadvantages exist in using operand isolation and controller-based power management techniques that are closer to the present invention than the other techniques mentioned above.

Operand isolation can be ineffective in practice due to the following reasons:

An abundance of smaller components like multiplexers dominate power consumption, while functional units may account for a small part of the total power. See A. Raghunathan, S. Dey, and N. K. Jha, "Glitch analysis and reduction in register-transfer-level power optimization," in *Proc. Design Automation Conf.,* pp. 331–336, June 1996. The power overhead due to inserting transparent latches is comparable to power savings obtained when power management is applied to subcircuits such as multiplexer networks.

The signals that detect idle conditions for various subcircuits are typically late-arriving (for example, due to the presence of nested conditionals within each controller state, the idle conditions may depend on outputs of comparators from the data path). Therefor, the timing constraints that must be imposed to apply conventional power management techniques (the enable signal to the transparent latches must settle before its data inputs can change) are often not met.

The presence of significant glitching activity at control as well as data path signals needs to be accounted for to obtain maximal power savings. See A. Raghunathan, S. Dey, and N. K. Jha, "Glitch analysis and reduction in register-transfer-level power optimization," in *Proc. Design Automation Conf.,* pp. 331–336, June 1996.

Controller-based power management alleviates the above problems to some extent, by avoiding adding additional circuitry such as transparent latches to the design (only the controller part of the circuit is redesigned), and accounting for potential negative effects such as an increase in circuit delay and glitching power during the power management process. See A. Raghunathan, S. Dey, and N. K. Jha, "Power management techniques for control-flow ,p intensive designs," in *Proc. Design Automation Conf.,* pp. 429–434, June 1997.

However, Controller-based power management (as well as most other known power management techniques) can only be applied to circuits whose structural representation is given or assumed. Thus, the existing structure of the circuit limits the extent to which they can reduce power. The structure of the circuit, which may have been manually fixed or determined through high-level synthesis (without consideration for power management) may be highly sub-optimal from the power management point-of-view.

Also, data-dominated behavioral descriptions are commonly encountered in signal and image processing applications, and are characterized by the predominance of arithmetic operations. In such a case, it has been observed that functional unit power consumption dominates the overall power consumption of these circuits, and that a significant fraction of this power is consumed when the functional units do not produce useful outputs. Conventional power management techniques, many of which involve placement of transparent latches at functional unit inputs, can increase circuit delays along the critical path. Thus, they may not be acceptable solutions for heavily performance-constrained designs.

II. SUMMARY OF THE INVENTION

It is an objective of this invention to solve the above-mentioned problems. Specifically it is an object of this invention to provide a new technique that exploits the relationship between the register sharing task in high-level synthesis and the unnecessary (spurious) operations executed by the functional units in the RTL implementation.

The present invention is geared toward enhancing power management opportunities during high-level synthesis of behavioral descriptions. High-level synthesis is the process of compiling a control-data flow graph (CDFG) description of the circuit into a register-transfer level (RTL) implementation.

To realize the objects of this invention it is provided a method of reducing power consumption in a sequential circuit comprising functional units, said method comprises register sharing and multiplexer configuration, wherein said register sharing and said multiplexer configuration eliminates unnecessary switching activity in at least one of said functional units.

Another aspect of this invention is a method of synthesizing sequential circuits having a plurality of variables, said method comprising extending lifetime of one or more of said plurality of variables and reconfiguring multiplexers based on the results of the earlier step. Further improvements include performing one of dynamically re-binding registers and duplicating registers to avoid unnecessary switching operations caused by a subset of said variables whose values are required in more than one iteration.

Yet another aspect of this invention is a method of synthesizing sequential circuits, comprising a plurality of functional units, a plurality of operations, each of said operations being associated with a plurality of input variables, said method comprising computing birth time of a left input of a succeeding operation, computing birth time of the right input of the succeeding operation, setting death time of the variable to be the maximum of the previous results, repeating calculations for each of said plurality of input variables associated with a operation, repeating calculations for said plurality of operations mapped to a functional unit and further repeating calculations for each of said functional units.

Further improvements include configuring multiplexers to select same inputs for cycle as in a previous cycle if the cycle is idle. Still further improvements include identifying a last operation mapped to a functional unit, identifying a first operation mapped to a functional unit, selecting an input variable for said last operation, identifying birth time of a left input of the last operation, identifying birth time of a right input of the last operation, determining if maximum of the results previous two steps is greater than birth time of the input variable, swapping variable assignments if overhead incurred is less than a preselected threshold and if the precious step is true, storing values of the input variable in additional registers if overhead incurred in is greater than a preselected threshold, repeating steps for all input variables mapped to a functional unit, and repeating for all functional units.

Another aspect of this invention is a system for synthesizing sequential circuits having a plurality of variables, wherein said system extends lifetime of one or more of said plurality of variables, reconfigures multiplexers based on extended lifetime of said variables. Further improvements includes a system wherein the system further performs one of dynamically re-binding registers and duplicating registers to avoid unnecessary switching operations caused by a subset of said variables whose values are required in more than one iteration.

III. LIST OF FIGURES

The above objectives and advantages of the present invention will become more apparent by describing in detail preferred embodiments thereof with reference to the attached drawings in which:

FIG. 2 shows a schematic showing switching activity for a design using prior art techniques.

FIG. 3 shows a schematic showing switching activity for a design using the present invention.

FIG. 9 shows a pseudocode for a checking procedure according to the present invention.

FIG. 10 shows a pseudocode for a procedure to handle inter-iteration dependencies according to the present invention.

IV. DETAILED DESCRIPTION

Figure 1:
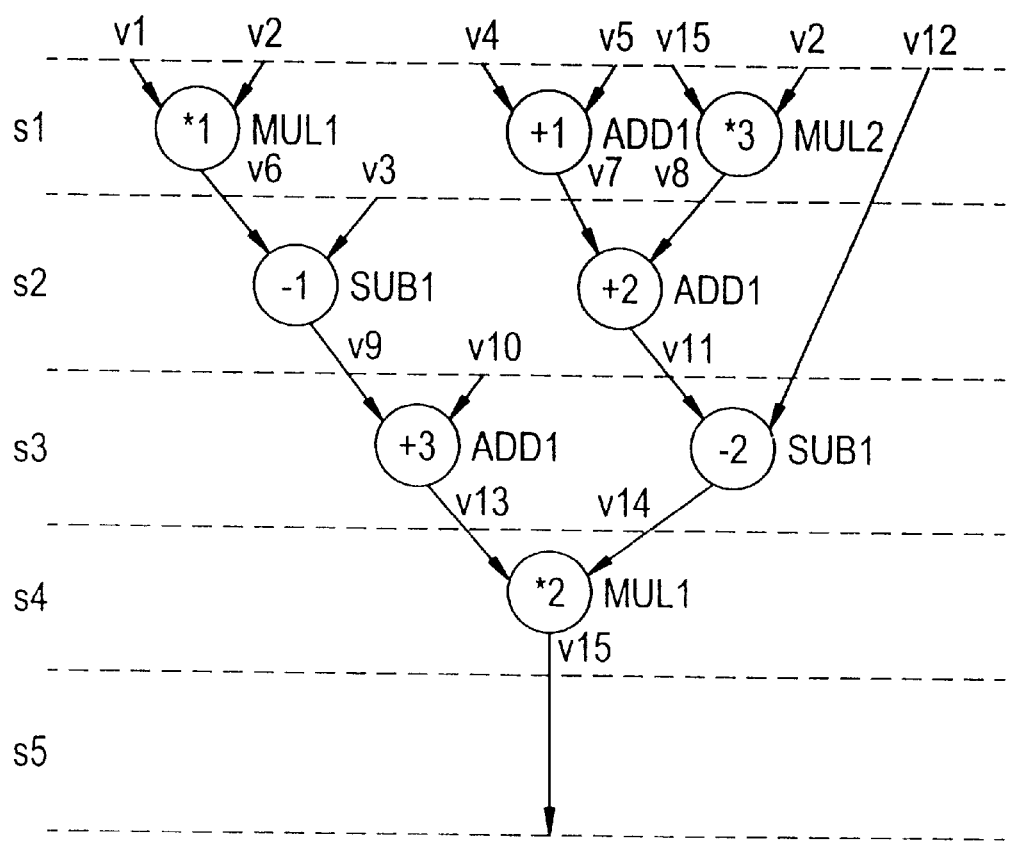
FIG. 1 shows a scheduled CDFG.

Consider a behavioral description of a circuit where scheduling and resource sharing have been performed by a high-level synthesis tool to generate an RTL implementation. Consider a functional unit in such an RTL implementation. This functional unit is said to be active during the control steps (clock cycles) in which it utilized to perform some computation from the behavioral description. It is idle during other control steps.

Though a functional unit need not perform any computation during its idle control steps, the inputs to the functional unit may change values in the RTL implementation, causing unnecessary power dissipation. It is clear that the manner in which registers are shared has a significant influence on the unnecessary power dissipation in functional units during their idle cycles.

A natural follow-up to the above observation is the question of whether register sharing can be constrained in any way, without incurring excessive overheads, to enable better power management for the functional units.

The present invention is based on the insight that register sharing influences power dissipation. The technique broadly comprises two key steps: extending variable lifetimes to ensure that the old operands of functional units are alive for a sufficient time, and dynamic variable re-binding to resolve inter-iteration lifetime conflicts between copies of the same variable in different CDFG iterations. In such a case an iteration refers to the processing of one set of inputs by the behavioral description or CDFG.

A constrained register sharing technique is provided, which can be integrated into existing high-level synthesis systems to produce architectures whose functional units do not waste power. This technique has been incorporated into the framework of an existing power-optimizing high-level synthesis system, which can handle multi-cycling, chaining, structurally pipelined functional units, and loops in the CDFG, and dynamically trade off the effects of several behavioral synthesis tasks such as functional unit selection (selecting the type of functional unit for an operation) scheduling, clock selection (choosing the clock period)

resource allocation (determining the number of each type of resource), resource sharing, and supply voltage scaling.

Experimental results indicate up to two-fold reduction in power at area overheads not greater than 6.4% without any degradation in performance, compared to power-optimized architectures. The present invention complements known register sharing techniques for low power, such as A. Raghunathan and N. K. Jha "Behavioral synthesis for low power in Proc. Int. Conf., Computer Design, pp. 255–270, October 1994, J. Chang and M. Pedram, "Register allocation and binding for low power in Proc. Design Automation Conf., pp. 29–35, June 1995 and C. H. Gebotys, "Low energy memory and register allocation using network flow in Proc. Design Automation Cont. pp. 435–440, which attempt to minimize switching activity at the output of registers during active clock cycles.

The present invention can be used in conjunction with any existing register sharing procedure (that does not consider power management).

The present invention replaces the need for using operand isolation on functional units in the RTL implementation. It assumes that the multiplexers in the data path will be configured appropriately as a post-processing step using a procedure such as controller-based power management. A. Raghunathan, S. Dey, and N. K. Jha, "Power management techniques for control-flow intensive designs," in *Proc. Design Automation Conf.*, pp. 429–434 (June 1997).

The rest of the discussion is organized as follows. Section IVA establishes that register binding (the assignment of variables to registers) can have a significant effect on power management opportunities and shows how, for a small overhead in the number of registers, reducing is possible significantly, or eliminate, spurious switching activity in functional units. Section IVB defines perfectly power-managed architectures and derives conditions on the schedule and variable assignment that need to be satisfied for perfect power management. Methods of the present invention and preferred embodiments are further discussed. Section IVC discusses a preferred embodiment where the techniques of the present invention are integrated into an existing high-level synthesis system to facilitate power management. Section IVD presents experimental results, and Section V the conclusions.

IVA. Effect of Register Sharing on Functional Unit Power Consumption

A key aspect of this invention is that power consumption can be reduced by a more appropriate sharing of registers. These effects of register sharing is presented herein using examples. Herein, it is shown that the manner in which register allocation and register binding are done can have a profound impact on spurious switching activity in a circuit. Further the elimination of spurious switching activity is illustrated from a design through a combination of techniques, with a small overhead in the number of registers. An example that shows that spurious switching activity can be eliminated without increasing the number of registers in the synthesized architecture is presented.

EXAMPLE 1

Consider the scheduled CDFG shown in FIG. 1. Each operation in the CDFG is annotated with its name (placed inside the circle representing the operation) and the name of the functional unit instance it is mapped to (placed outside the circle representing the operation). Each variable in the CDFG is annotated with its name. Clock cycle boundaries are denoted by dotted lines. The schedule has five control steps, s1, . . . , s5. Control step s5 is used to hold the output values in the registers and communicate them to the environment that the design interacts with, and to load the input values into their respective registers for the next iteration.

To assess the impact of variable assignment on power consumption, consider two candidate assignments, Assignment 1 and Assignment 2, shown in Table 1. The architectures obtained using these assignments were subject to logic synthesis optimizations, and placed and routed using a 1.2 micron standard coil library. The transistor-level netlists extracted from the layouts were simulated using a switch-level simulator with typical input

TABLE 1

Two variable assignments for the scheduled CDFG shown in FIG. 1

| Register | Assignment 1 | Assignment 2 |
|---|---|---|
| R1 | v1, v7, v11, v13 | v1, v13 |
| R2 | v2, v8, v10, v14 | v2 |
| R3 | v3, v5, v9 | v4, v8, v10 |
| R4 | v4, v6 | v5, v7, v9 |
| R5 | v12 | v12 |
| R6 | v15 | v3 |
| R7 | — | v6, v11 |
| R8 | — | v14 |
| R9 | — | v15 | traces to measure power. For the circuit Design 1, synthesized from Assignment 1, the power consumption was 30.71 mW, and for the circuit Design 2, synthesized from Assignment 2, the power consumption was 18.96 mW To explain the significant difference in power consumption of the two designs, the switching activities in the functional units that constitute Design 1 and Design 2 are analyzed using FIGS. 2 and 3, respectively. In these figures, each functional unit is represented by a labeled box. The vertical lines which feed the box represent a duration equaling one iteration of execution of the CDFG. Each control step is annotated with (i) the symbolic values that appear at the inputs of the functional unit in the implementation, and (ii) the operation, if any, corresponding to the computation performed by the functional unit.

For example, for functional unit MUL1 FIG. 2 in control step s1, variables v1 and v2 appear at its left and right inputs, respectively. The computation performed by MUL1 in control step s1 corresponds to operation *1 of the CDFG. Cycles in which one or both inputs of a functional unit change, causing power dissipation, are shaded in the figures. Each variable change can be associated with the execution of a new operation. Cycles during which spurious input transitions, which do not correspond to any CDFG operations, occur are marked with an X.

The power consumption associated with these operations can be eliminated without altering the functionality of the design. A functional unit does not perform a spurious operation when both its inputs are unaltered. A cycle in which an input of a functional unit does not change is not marked with any variable. For example, in FIG. 3, the inputs of functional unit MUL1 do not change from control step s1 to control step s2. Therefore, the inputs of MUL1 are unmarked in control step s2.

An inspection of FIGS. 2 and 3 reveals that, while the functional units that constitute Design 1 execute eight spurious operations, the functional units that constitute Design 2 execute only one spurious operation. This explains the difference in power consumption between the two designs.

EXAMPLE 2

The previous example illustrated that constrained register sharing can significantly reduce the number of spurious operations m a circuit. This example illustrates another technique, called dynamic register rebinding which, in combination with variable assignment, can further eliminate spurious operations.

Consider functional unit SUB1 in Design 2. An inspection of FIG. 3 reveals that it executes a spurious operation in control step s1 of every iteration. This is because the multiplexer at its input selects register R5, to which variable v12 is assigned, from control step s3 of each iteration to control step s1 of the next iteration. Since v12 acquires a new value in control step s1 of each iteration, SUB1 computes v11−v12 in control step s1, which is spurious, since the value of v11 corresponds to the previous iteration while the value of v12 corresponds to the current iteration. This problem would persist even if v3 were selected at the input of SO B1, instead of v12. This is because v3 is generated only at the end of control step s1, causing SUB1 to evaluate v11−v3 with the old value of v3. Note that, in order to avoid the spurious operation, it is necessary to preserve the old value of v12 (from the previous iteration) at the input of SUB1 until the new value of v3 in the current iteration is born.

In this case, the spurious operation can be eliminated, without paying a price in terms of the number of registers used, by swapping the variables assigned to registers R5 and R6 in alternate iterations. In even iterations, v3 is mapped to R6 and v12 to R5 and vice versa in odd iterations.

TABLE 2

Figure 5:
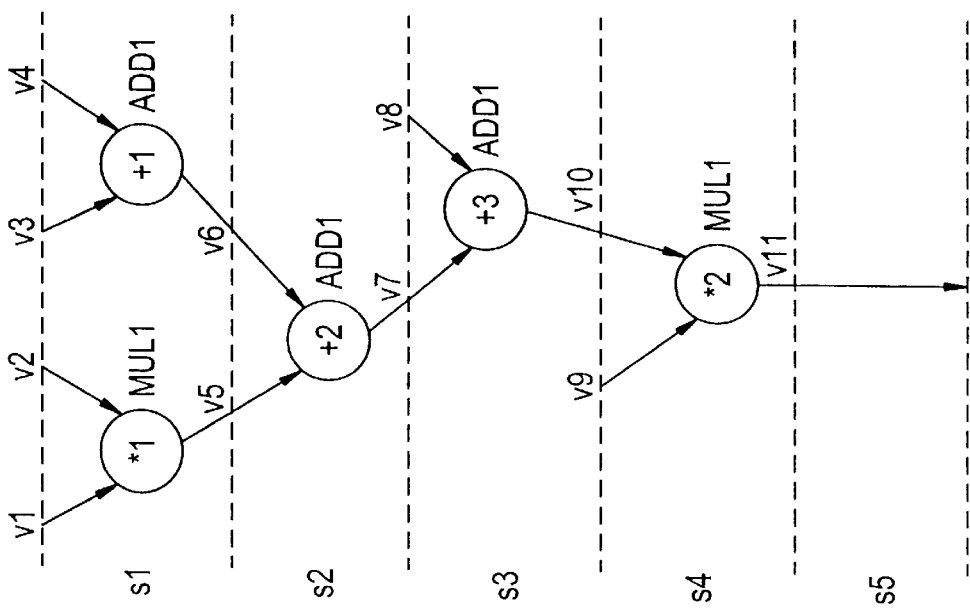
FIG. 5 shows a scheduled CDFG to illustrate a further aspect of this invention.

Two variable assignments for the scheduled CDFG shown in FIG. 5

| Register | Assignment 1 | Assignment 2 |
|---|---|---|
| R1 | v1, v5, v7, v9 | v1, v9 |
| R2 | v2, v6, v8, v10 | v2, v10 |
| R3 | v3 | v3, v5, v7 |
| R4 | v4 | v4, v6, v8 |

Figure 4:
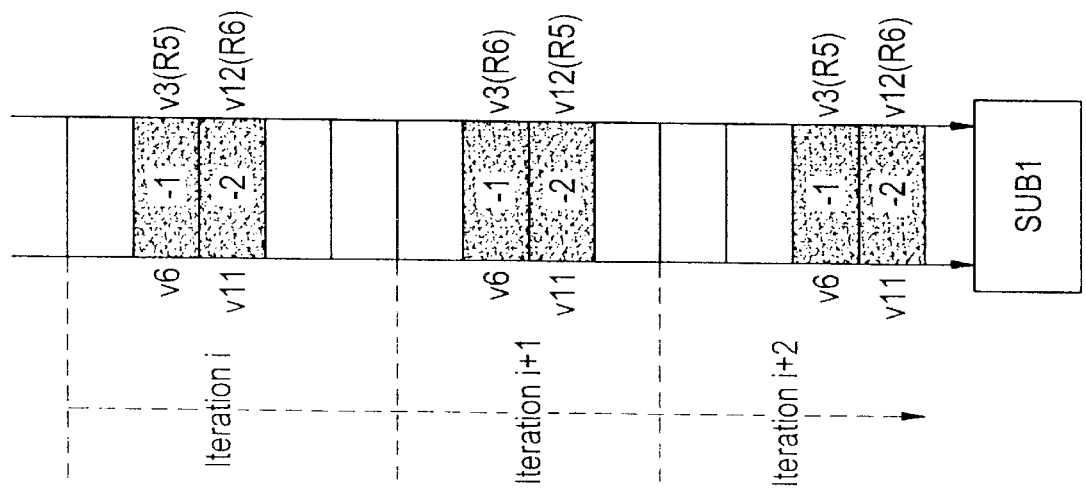
FIG. 4 illustrates transformations over three iterations of execution of a sequential design.

FIG. 4 illustrates this transformation over three iterations of execution of the design. In this figure, the line representing the right input of SUB1 is annotated with the register containing the selected variable. As shown in the figure, register R6 stores variable v12 in iteration i, v3 in iteration i+1, and so on. Since variable v3 is stored in register R6 in iteration i+1 the old value of v12 is preserved at the input of SUB1 until v3 is born, thus avoiding the spurious operation marked X, shown in FIG. 3.

In Examples 1 and 2, it was shown that, for a small increase in the number of registers, it is possible to reduce significantly or eliminate spurious operations. However, sometimes, spurious operations can be eliminated at no extra register cost, as illustrated by the following example.

EXAMPLE 3

Consider the scheduled CDFG shown in FIG. 5. Table 2 shows two candidate variable assignments, Assignment 1 and Assignment 2, both of which require the same number of registers. Upon synthesis, the architectures corresponding to the two designs were simulated with typical input traces to determine the power consumption.

The architecture derived using the variable assignment shown in Assignment 1 consumed 42.86 mW, while the architecture derived using Assignment 2 consumed 34.05 mW. It can be seen that, for the design obtained from Assignment 1, functional unit MUL1 executes spurious operations in cycles s2 and s3, and functional unit ADD1 executes a spurious operation in cycle s4. For the design obtained from Assignment 2, the chosen variable assignment is such that no spurious operations are executed.

The above examples serve to illustrate that judicious variable assignment is a key factor in the elimination of spurious operations. The present invention aims to eliminate spurious operations in functional units. The architectures produced by applying the techniques of the present invention are referred to as perfectly powermanaged, since the functional units in these architectures do not execute any spurious operations, i.e., any operation performed on a functional unit is a valid one required by the CDFG.

In the following sections, conditions on the schedule and variable assignment are derived. When satisfied, these conditions result in perfectly power managed architectures. Integration of these conditions into an existing power-optimizing high-level synthesis system is also described.

IVB. Perfect Power Management

Another key aspect of this invention is the identification of conditions that, when satisfied, ensures perfect power management. In this section, such conditions are derived.

Consider a functional unit, fu, which performs an operation of type op, executing operations op1, op2, ..., op(i−1), and opi, which are scheduled in time steps t1, t2, ..., t(i−1), and ti, respectively. Operation opj is fed by variables vj_1 and vj_2, at its left and right inputs, respectively, and generates variable vj_out. fu consumes power wherever any of its inputs changes. The total power consumed can be written as $$P\_fu = \Sigma P(vj'\_1, v(j+1)'\_1, vj'\_2, v(j+1)'\_2) \quad (1)$$

cycles when variable at one or both of fu's ports changes where vj'_1 (vj'_2) is the variable at the left (right) input of fu before the change and v(j+1)'_1 (v(j+1)'_2) is the new variable, and P(vj'_1, v(j+1)'_1, vj_2, v(j+1)'_2) is the power consumption associated with the variable change.

Thus, variables at the inputs of the functional unit are shown primed, and variables which feed operations are shown unprimed. This distinction is made because the variables that feed a functional unit are a superset of the variables that feed the operations mapped to it. For example, suppose the variables that appear at the input of a functional unit fu1, performing operation op1 (inputs v1_1 and v1_2), depend upon registers R1 and R2, which feed its left and right inputs, respectively. Assuming that v1_1 and v3_1 are mapped to R1, and v1_2 and v2_2 are mapped to R2, then v1_1, v3_1, v1_2, v2_2 appear at the functional unit's inputs. These variables are denoted as primed variables, and a subset of them correspond to v1_1 and v1_2. In general, P(vj'_1, v(j+1)'_1, vj_2, v(j+1)'_2) depends upon the implementation of the functional unit and on the signal statistics associated with variables P(vj'_1, v(j+1)'_1, vj_2, v(j+1)'_2). Any pair {vj_1, vj'_2}, of variables occurring simultaneously at the left and right inputs of fu, such that op (vj'_1, vj'_2) is not required by the CDFG, constitutes a spurious operation, and the operations caused by the change can be eliminated without altering the functionality of the circuit. When all such spurious operations are eliminated, an architecture becomes perfectly power managed, as illustrated by Example 4.

EXAMPLE 4

Figure 6:
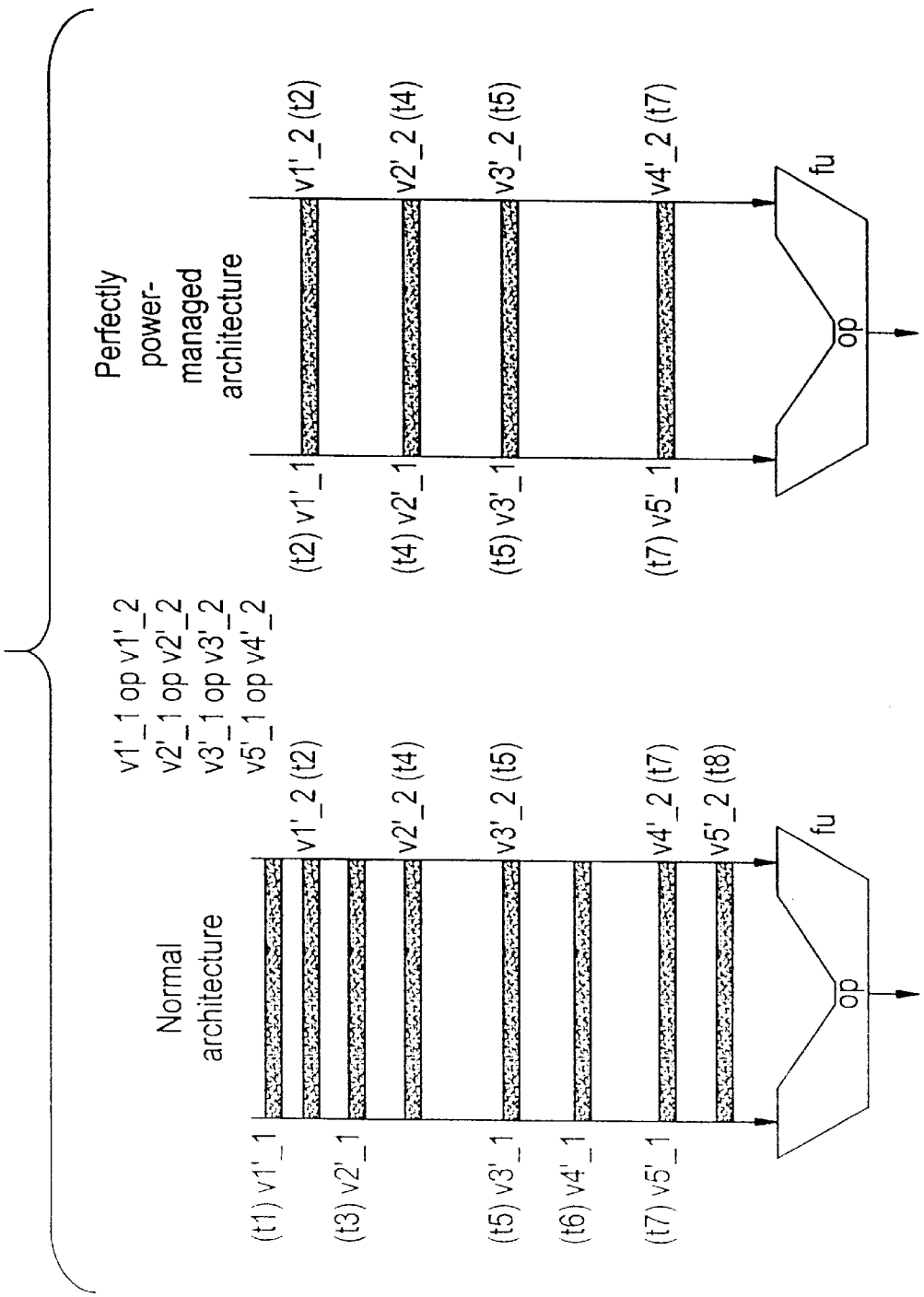
FIG. 6 shows a functional unit in an imperfectly power-managed architecture on the left and a functional unit in a perfectly power-managed architecture on the right.

FIG. 6 shows a functional unit in an imperfectly power-managed architecture on the left and a functional unit in a perfectly power-managed architecture according to the present invention on the right. The lines at the left and right inputs of the functional unit denote the time axis and are annotated with input variables and their birth cycles. The shaded bars correspond to changes in input values and represent cycles in which power is consumed. As shown in the figure, in the case of perfectly power-managed architectures, all power consuming input-changes correspond to operations required by the CDFG.

IVB.1 Conditions for Perfect Power Management

The following three conditions are sufficient to guarantee perfect power management:

The sequence of values appearing at the left input of fu in any iteration corresponds to $v1\_1, v2\_1, \ldots, vi\_1$.

The sequence of values appearing at the right input of fu in any iteration corresponds to $v1\_2, v2\_2, \ldots, vi\_2$.

The values at the inputs of fu in any clock cycle correspond to some pair $(vj\_1, vj\_2), 1 \leq j \leq i$.

Under the stated conditions, it can be clearly seen that every operation executed on the functional unit generates a useful output, and no unnecessary operations are introduced, thus ensuring perfect power management. For these conditions to be satisfied, the multiplexers at the left and right inputs of the functional unit should select variables $vj\_1$ and $vj\_2$, respectively, where $1 \leq j \leq i$, until $v(j+1)\_1$ and $v(j+1)\_2$ are available. This can be done only if the values of $vj\_1$ and $vj\_2$ are available in the registers they are assigned to until $\max(\text{birth}(v(j+1)\_1), \text{birth}(vj+1)\_2))$, where $\text{birth}(vi\_k)$ is the birth time of variable $vi\_k$.

However in some cases, extending variable lifetimes (the interval between the birth and death of a variable) in this manner would lead to unsatisfiable constraints, as explained in Section IVB.2.

IVB.2 Dynamic Register Rebinding

Figure 7:
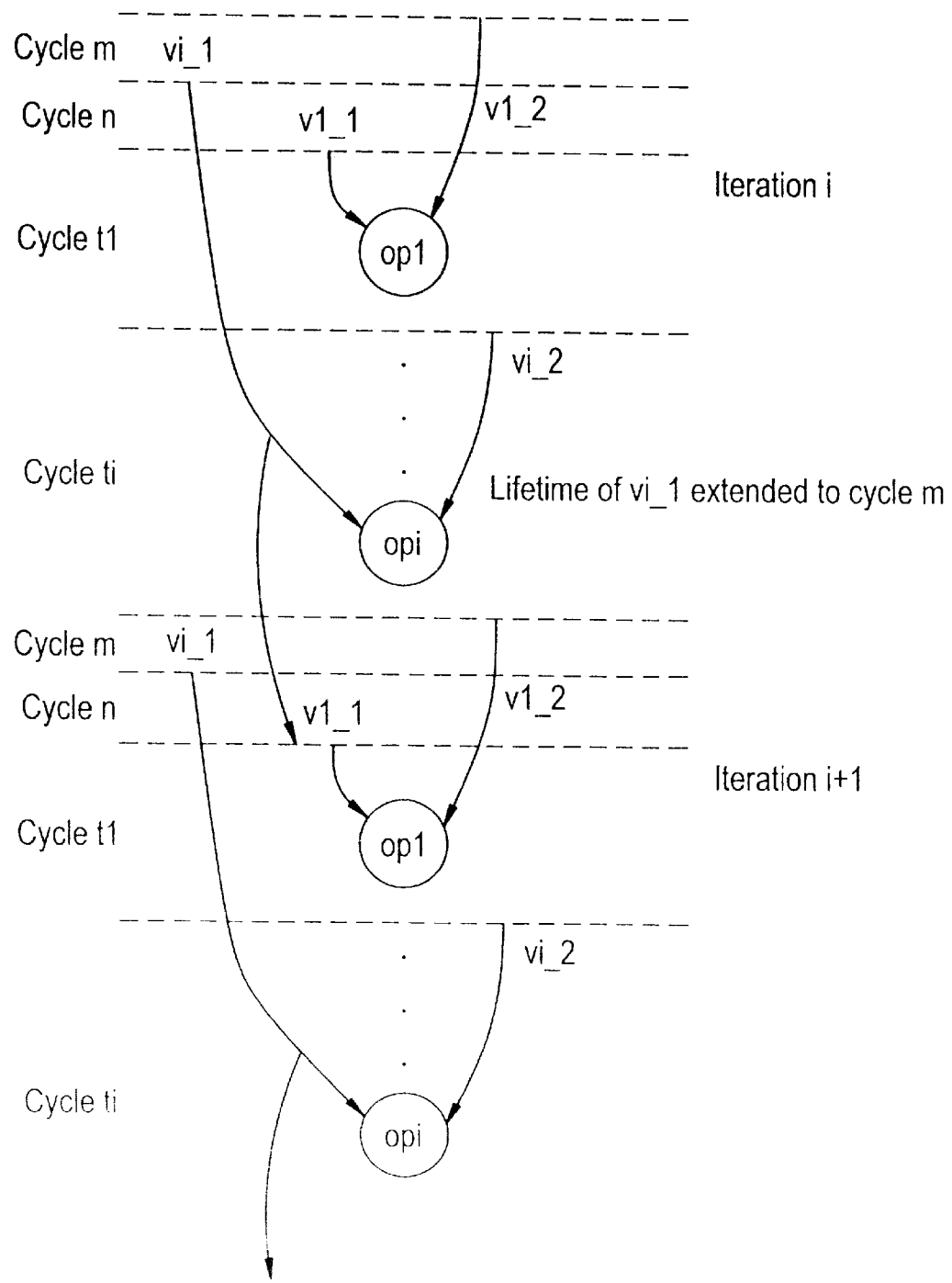
FIG. 7 shows the operations performed by functional unit fu over two iterations of execution of a CDFG.

FIG. 7 shows the operations performed by functional unit fu over two iterations of execution of the CDFG. The sequence of operations performed by fu in an iteration is op1, op2, ..., opi. Variable $vi\_1$ is born in cycle m, and variable $v1\_1$ in cycle n, where m<n. In this case, in order to avoid the execution of spurious operations, the new value of $v1\_1$ should succeed $vi\_1$ at the left input of fu. Therefore, $vi\_1$ must be selected at the left input of until cycle n.

However, since $vi\_1$ acquires a new value in cycle m, the functional unit consumes unnecessary switching power in cycle m. Therefore, for perfect power management, the new value of $vi\_1$ needs to be stored in a separate register, leaving the old value intact, until it is no longer needed. Thus, different instances of the same variable, generated in different iterations of execution of the CDFG, need to be mapped to different registers. This can be done easily at the expense of one extra register, by buffering the new value of $vi\_1$ in a spare register before allowing it to feed fu. It should be noted that, another aspect of this invention provides a register-overhead free solution to this problem, called dynamic register rebinding, which is described next.

Let R1 and R8 denote the registers to which variables $v1\_1$ and $v1\_1$ are mapped. In alternate iterations of the CDFG, the variable assignments for registers R1 and R8 are swapped, i.e., if S1 denotes the set of variables mapped to R1 and S8 denotes the set of variables mapped to R2 in an even iteration, the variables in S1 (S8) are mapped to R2 (R1) in an odd iteration. Under this scenario, the of old value of $vi\_1$ is preserved in R2 until $v1\_1$ is born, which guarantees the absence of unnecessary switching activity in fu. Note, however, that this solution could lead to extra interconnect in the datapath because every functional unit initially feeding R1 (R,) should now also feed R2 (R1), and every functional unit initially fed by R1 (R8) should now also be fed by R2 (R1).

In practice for interconnect overheads (measured as number of 2-to-1 multiplexers added) up to a threshold of four, this method is adopted. For interconnect overheads exceeding four, register duplication is preferred. This threshold was based on power estimation experiments.

IVB.3 The Algorithm

The techniques of constrained register sharing, dynamic register rebinding, and register duplication presented in the earlier sections can be incorporated into any high-level synthesis system. In this section, an algorithm for perfect power management in the context of a power-optimizing high-level synthesis system is provided. See A. Raghunathan and N. K. Jha ["An iterative improvement algorithm for low power datapath synthesis"] Proc. Int. Conf., Computer Aided Design, pp. 597–602, November 1995. An overview of the system is presented followed by a description of the modifications necessary to produce perfect power-managed architectures.

Figure 8:
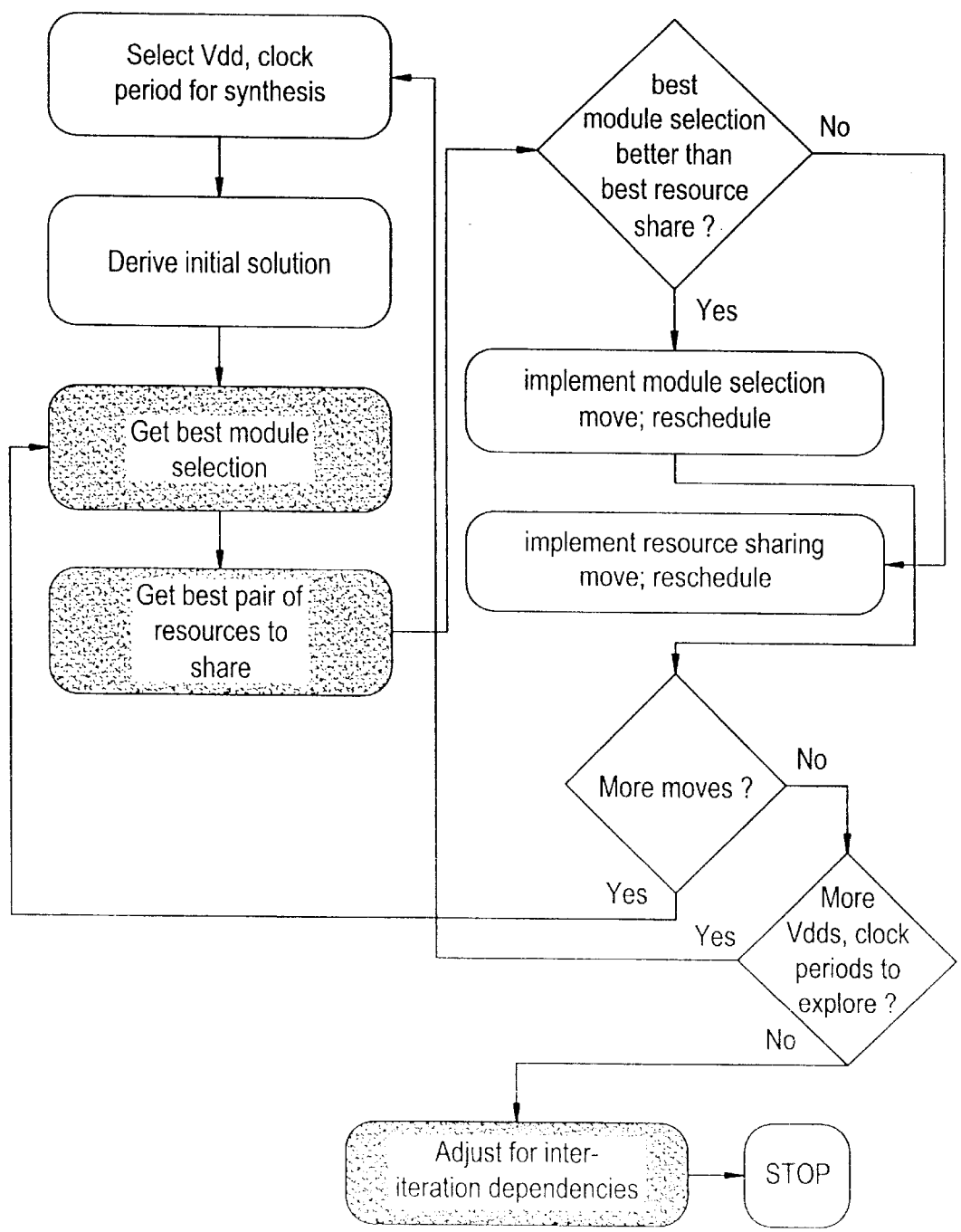
FIG. 8 illustrates the basic steps of the high-level synthesis system, using techniques of the present invention.

FIG. 8 illustrates the basic steps of the high-level synthesis system, which is based on an iterative improvement technique which can escape local minima. The system accepts as input, a behavioral description compiled into a CDFG, a library of modules precharacterized for area, clay and power, a set of typical input traces to facilitate power estimation and the sampling period (the dime interval between the arrival of two successive iterations of inputs).

Synthesis starts in 810 with the identification of set of feasible clock periods and supply voltages. For each such pair, synthesis is initiated with the derivation of an initial solution in 820. Complete scheduling, allocation and binding information which is transformed by the application of a sequence of moves (individual moves are allowed to have a negative gain).

"Move" an 830–860 can replace an instance of a functional unit in the datapath by one of a different type, merge pairs of functional units or registers into one, or split a functional unit or register into multiple functional units or registers. The power impact of each of these moves is evaluated and the most power-efficient sequence of moves the does not violate sampling constraints is implemented.

The boxes shown shaded in FIG. 8 indicate the synthesis steps which need to be modified to incorporate perfect power management. The power management technique is applied at three stages. The first two stages 830, 840 belong to move-selection Procedures, and the third 880 occurs after iterative improvement. The first two states ensure perfect power management within each CDFG iteration, but ignore inter-iteration effects described in Section IVB.2. The third stage, which occurs after synthesis, is intended for the correction of such inter-iteration problems.

A complete schedule and datapath exist at every step of the algorithm, i.e., before and after the application of each move. When a module selection, resource sharing, or resource splitting move is considered the resulting architecture is first scheduled to ensure that a valid schedule exists. After an architecture is scheduled, variable lifetimes are checked to see if their intra-iteration extensions, required to ensure the absence of spurious operations, cause any conflicts in variable lifetimes.

The initial solution is characterized by the absence of spurious operations, since each variable is mapped to a separate register. Architectures which display spurious operations are rejected. Typically, spurious operations are introduced only by moves that attempt to merge different registers into one. Therefore, this restriction does not, in practice, affect functional unit sharing, or splitting, or module selection moves. At this stage, it is not determined if an input variable of the last operation (by ascending order of birth) mapped to a functional unit can be kept alive until all inputs to the first operation mapped to the functional unit are born in the next iteration. This is because, even if this problem is detected and solved at this stage, extra registers added or inter-iteration assignment swaps performed to fix the problem during one move of iterative improvement might prove inadequate or redundant because of future moves.

The pseudocode for the checking procedure is shown in FIG. 9. The outer loop represents the traversal of the functional units that constitute the datapath. The operations mapped to the functional unit are then traversed in increasing order of birth. Each input variable, v, of the operation, op, is then checked to ensure that its death time can be extended up to the birth time of the latest arriving input of the operation which immediately follows op. If so, the multiplexers at the input of the functional unit under consideration select variable v to appear at the appropriate input until the latest arriving input of op is born. If not, the architecture is not deemed perfectly power-manageable and a different one is considered. Since the initial architecture is guaranteed to be free of spurious operations of the kind that this subroutine checks for, the synthesis algorithm of the present invention always yields a valid solution.

Problems induced by inter-iteration dependencies are solved once iterative improvement terminates. The pseudocode for the procedure to handle inter-iteration dependencies is shown in FIG. 10, and corresponds to the shaded box in FIG. 8 that corresponds to the penultimate step of the synthesis algorithm. As before, the outer loop represents traversal of functional units in the datapath. In this case, the first- and last-born operations mapped to the functional unit are of interest. If an input variable to the last-born operation has a birth time less than the birth time of the latest arriving input to the first-born operation, the architecture is not perfectly

TABLE 3

Power saving and area overhead results

| Circuit | P (mW) | | A (x $10^5 \lambda^2$) | | P.S. (%) | A. O. (%) |
| --- | --- | --- | --- | --- | --- | --- |
| | SCALP | PPM | SCALP | PPM | | |
| Paulin | 27.6 | 21.8 | 87.2 | 92.8 | 20.9 | 6.4 |
| Tseng | 31.8 | 21.3 | 61.7 | 61.8 | 33.0 | 0.2 |
| Testl | 42.9 | 34.1 | 32.8 | 32.3 | 20.6 | −1.6 |
| Dot. prod | 52.2 | 24.8 | 51.8 | 54.2 | 52.5 | 4.7 |
| Lat | 44.5 | 35.2 | 71.3 | 75.2 | 20.9 | 5.5 |
| Fir | 30.3 | 27.8 | 39.4 | 37.9 | 8.4 | −4.0 | power-managed. This problem is handled either by register duplication, or by an inter-iteration variable assignment swap.

Figure 11:
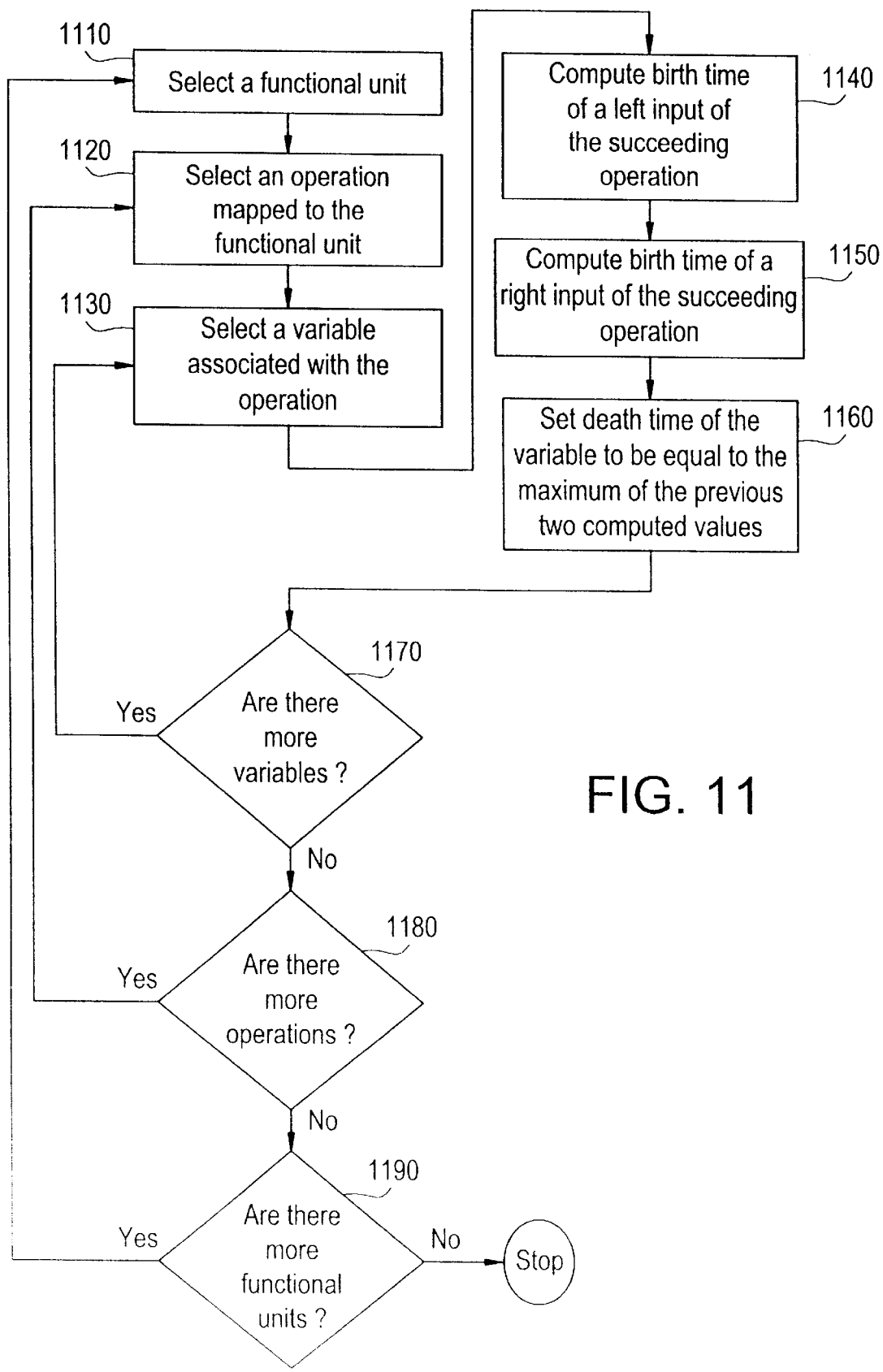
FIG. 11 shows a flowchart depicting a pretend embodiment of the present invention.

The flowchart shown in FIG. 11 depicts an embodiment of the present invention. This flowchart is self-explanatory.

IVB. 4 Experimental Results

A preferred embodiment of the present invention is implemented within the framework of the power-optimizing high-level synthesis system SCALP. See A. Raghunathan and N. K. Jha "An iterative improvement algorithm for low power datapath synthesis" in Proc. Int. Conf., Computer Aided Design, pp. 597–602, November 1995. The experiments evaluate the techniques of the present invention using several behavioral descriptions of signal and image processing applications.

The modified SCALP reads in a textual description of a CDFG, and perforans $V_{dd}$ section, clock selection, functional unit selection, scheduling, resource allocation and binding, finally resulting in a power-optimized, perfectly power-managed architecture, which consists of a datapath netlist, and a finite-state machine description of the controller. The controller and datapath netlists are merged and mapped to the MSU standard cell library using the SIS logic synthesis system. Placement and routing are performed using tools from the OCTTOOLS suite.

A switch-level circuit extracted from the layout is simulated using the switch-level simulator, IRSIM-CAP, and the capacitance switched is recorded and used to estimate the Dower consumption. Since the power consumption is estimated from a layout-based simulation, it is possible to accurately estimate controller power, glitching power, interconnect power, clock power, etc., which cannot be easily accounted for at the higher levels. The input sequences used for simulation are obtained by first generating a zero-mean Gaussian sequence and then passing the result through an autoregressive filter to introduce the desired level of temporal correlation.

Table 3 shows the experimental results obtained. The first column gives the name of the circuit. Of the benchmarks, Paulin Tseng, and Dot prod are well known high-level synthesis benchmarks. Lat and Fir are a part of the HYPER distribution. See J. Rabaey, C. Chu, P-Hoang and M. Potkonjak, "Fast prototyping of data path intensive architectures", IEEE Design 4 Test of Computers, pp. 40–51, February 1991. Test1 is the CDFG shown in Example 3.

Major columns P and A show the power consumption and area of the circuits Synthesized without and with perfect power management. Note that, in either case, the control signals to the multiplexers and registers in the circuit were specified to optimize the power consumption of the design, using techniques presented in 171. Minor columns SCALP and PPM refer, respectively, to architectures optimized by unmodified SCALP (without the aid of power management) and by techniques of the present invention. Columns P.S. and A.O. represent the power savings and area overheads for perfectly power-managed designs with respect to power-optimized designs obtained from unmodified SCALP. The cycle time of the synthesized designs was fixed at 25 ns and the sampling periods of the SCALP and perfectly power-managed designs were constrained to be equal. The results obtained indicate that for the same delay, the present invention achieves a 26.045% average power-reduction over already power-optimized circuits at an average area overhead of only 1.89%.

V. Conclusions

In this invention, the concept of perfect power management, which is geared toward eliminating spurious switching activity in the functional units that constitute a data-dominated circuit is provided. It is demonstrated that the manner in which variables are assigned to registers can have a profound impact on the existence of spurious operations. Conditions on variable assignment whose satisfaction guarantees the absence of spurious operations in the functional units that constitute a datapath are derived. An algorithm, based on these conditions, which can be incorporated into an existing high-level synthesis system, to eliminate spurious switching activity in functional units is provided. An implementation of the invention within the framework of an existing high-level synthesis system, geared towards power optimization demonstrated up to two-fold reduction in power at area overheads not exceeding 6.4%, without any degradation in performance of the synthesized architecture.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of reducing power consumption in a sequential circuit comprising functional units, said method comprises
   a) performing register sharing; and
   b) performing multiplexer configuration,
   wherein said register sharing comprises assignment of multiple variables to at least one register, and
   wherein said said steps a and b are performed to eliminate unnecessary switching activity in at least one of said functional units.

2. A method of synthesizing a sequential circuit from behavioral specification, said sequential circuit having a plurality of variables, said method comprising:
   a) extending lifetime of one or more of said plurality of variables; and
   b) reconfiguring multiplexers in the sequential circuit based on the results of step a.

3. The method of claim 2 further comprising:
   c) performing one of dynamically re-binding registers and duplicating registers to avoid unnecessary switching operations caused by a subset of said plurality of variables, wherein values of said subset of said plurality of variables are required in more than one iteration.

4. A method of synthesizing a sequential circuit, comprising a plurality of functional units, a plurality of operations mapped to each of said plurality of functional units, each of said plurality of operations being associated with a plurality of input variables, said method comprising:
   a) selecting a functional unit;
   b) selecting an operation mapped to said functional unit of step a;
   c) selecting a variable associated with said operation of step b;
   d) computing a first birth time of a left input of a succeeding operation of said operation of step b;
   e) computing a second birth time of a right input of said succeeding operation of step d;
   f) setting death time of a variable to be the maximum of the first birth time and the second birth time;
   g) repeating steps c–f for each of said plurality of input variables associated with said operation of step b;
   h) repeating steps b–g for each of said plurality of operations mapped to said functional unit of step a; and
   i) repeating steps a–h for each of said functional units.

5. A method of synthesizing a sequential circuit, comprising a plurality of functional units, a plurality of operations mapped to each of said plurality of functional units, each of said plurality of operations being associated with a plurality of input variables, said method comprising:
   a) selecting a functional unit;
   b) selecting an operation mapped to said functional unit of step a;
   c) selecting a variable associated with said operation of step b;
   d) identifying a last operation mapped to said functional unit;
   e) identifying a first operation mapped to said functional unit;
   f) selecting an input variable for said last operation;
   g) identifying a third birth time of a left input of the first operation;
   h) identifying a fourth birth time of a right input of the first operation;
   i) determining if maximum of the third birth time and the fourth birth time is greater than birth time of the input variable of step f;
   j) swapping variable assignments if overhead incurred in said swapping is less than a preselected threshold and if step i is true;
   k) storing values of the input variable of step f in additional registers if said overhead is greater than a preselected threshold and if step i is true;
   l) repeating steps f–k for all input variables corresponding to said last operation;
   m) repeating steps a–l for all functional units; and
   n) configuring multiplexers belonging to said sequential circuit to select same inputs for a current iteration cycle as in a previous iteration cycle if the current iteration cycle is idle.

6. A system for synthesizing a sequential circuit having a plurality of variables, wherein said system extends lifetimes of at least one of said plurality of variables to yield extended lifetimes, and reconfigures multiplexers based on said extended lifetimes.

7. The system of claim 6 wherein the system further performs one of dynamically re-binding registers and duplicating registers to avoid unnecessary switching operations caused by a subset of said plurality of variables values of said subset of said plurality of variables are required in more than one iteration.

* * * * *